United States Patent
Guichard

(12) 
(10) Patent No.: US 6,191,580 B1
(45) Date of Patent: Feb. 20, 2001

(54) CONFIGURABLE INDUCTIVE PROXIMITY DETECTOR TO DETECT FERROUS OR NON-FERROUS METAL OBJECTS

(75) Inventor: Christophe Guichard, Angouleme (FR)

(73) Assignee: Schneider Electric SA, Boulogne-Billancourt (FR)

( * ) Notice: Under 35 U.S.C. 154(b), the term of this patent shall be extended for 0 days.

(21) Appl. No.: 09/201,901

(22) Filed: Nov. 30, 1998

(30) Foreign Application Priority Data

Nov. 28, 1997 (FR) .................................................. 97 15132

(51) Int. Cl.$^7$ ................................. G01V 3/10; H03K 17/95
(52) U.S. Cl. .................... 324/207.26; 324/234; 324/236; 324/327; 331/65; 307/116
(58) Field of Search .................... 324/207.16, 207.26, 324/233, 234, 236, 327, 328; 331/65; 361/180; 307/116, 117

(56) References Cited

U.S. PATENT DOCUMENTS

| | | | |
|---|---|---|---|
| 5,519,317 | 5/1996 | Guichard et al. ..................... | 324/236 |
| 5,767,672 | * 6/1998 | Guichard et al. ..................... | 324/236 |

FOREIGN PATENT DOCUMENTS 0 678 759   10/1995   (EP) .
2 716 979    9/1995   (FR) .

* cited by examiner

*Primary Examiner*—Gerard Strecker
(74) *Attorney, Agent, or Firm*—Oblon, Spivak, McClelland, Maier & Neustadt, P.C.

(57) ABSTRACT

An oscillator 12 outputs a constant frequency as a metal object is brought close and this frequency forces oscillation of an oscillating circuit 11 which is sensitive to this metal object, at a level significantly below the critical natural frequency of the oscillating circuit. The oscillating signals S1, S2 are applied to the two inputs of a phase detector 15, such that they can be changed over by means of an inverter device 17, so that the detector can be configured in ferrous mode or in non-ferrous mode.

4 Claims, 1 Drawing Sheet

CONFIGURABLE INDUCTIVE PROXIMITY DETECTOR TO DETECT FERROUS OR NON-FERROUS METAL OBJECTS

BACKGROUND OF THE INVENTION

1. Field of the Invention

This invention relates to an inductive proximity detector that can be configured to selectively detect ferrous or non-ferrous metal objects.

2. Description of the Related Art

There are many inductive detectors comprising:
a coil forming part of an LC oscillating circuit that generates an oscillation and the inductance of which is sensitive to the presence of a metal object, such that the natural frequency of the oscillating circuit varies as this type of object is brought close,
an oscillator generating a fixed oscillation independent of whether or not the object is present, that forces the oscillating circuit through coupling means, and,
a processing circuit with two inputs, firstly the fixed oscillation signal output from the oscillator, and secondly the variable oscillation signal output from the oscillating circuit and which outputs a detection signal in the presence of the object.

This type of detector, capable of selectively detecting ferrous and non-ferrous metal objects, is described in patent FR-2 716 979.

SUMMARY OF THE INVENTION

It is an object of the present invention to provide a simple detector capable of detecting ferrous and non-ferrous objects.

It is another object of the present invention to provide a detector that can be configured on the manufacturing site, or even on the usage site, depending on the nature of the metals to be detected.

In other words, the purpose of the invention is to be able to easily configure inductive proximity detectors to assign them to ferrous or non-ferrous metal detection.

According to the invention, in an inductive proximity detector of the type described above, the frequency f of the oscillation generated by the oscillator is less than the critical frequency fc of the oscillating circuit; the processing circuit comprises a phase detector provided with a first input and a second input, the fixed oscillation signal being applied to the first input and the variable oscillation signal being applied to the second output, or vice versa by means of a configuration inverter device.

The proximity detector can thus be configured in ferrous or non-ferrous mode by an inverter device with mechanical or electronic control; the simplicity of this configuration is due firstly to the fact that the invariable frequency output by the oscillator is very much lower than the critical frequency of the oscillating circuit, and that the direction of the variation of the inductance is therefore significantly different depending on whether the object is ferrous or non-ferrous; and secondly due to the fact that it is very easy to changeover signals at the phase detector input.

The configuration inverter device also makes it easy to configure the detector output, into a normally open or a normally closed output.

BRIEF DESCRIPTION OF THE DRAWINGS

The following description relates to a nonrestrictive embodiment of the invention, with reference to the attached drawing.

DESCRIPTION OF THE PREFERRED EMBODIMENTS

Figure 1:
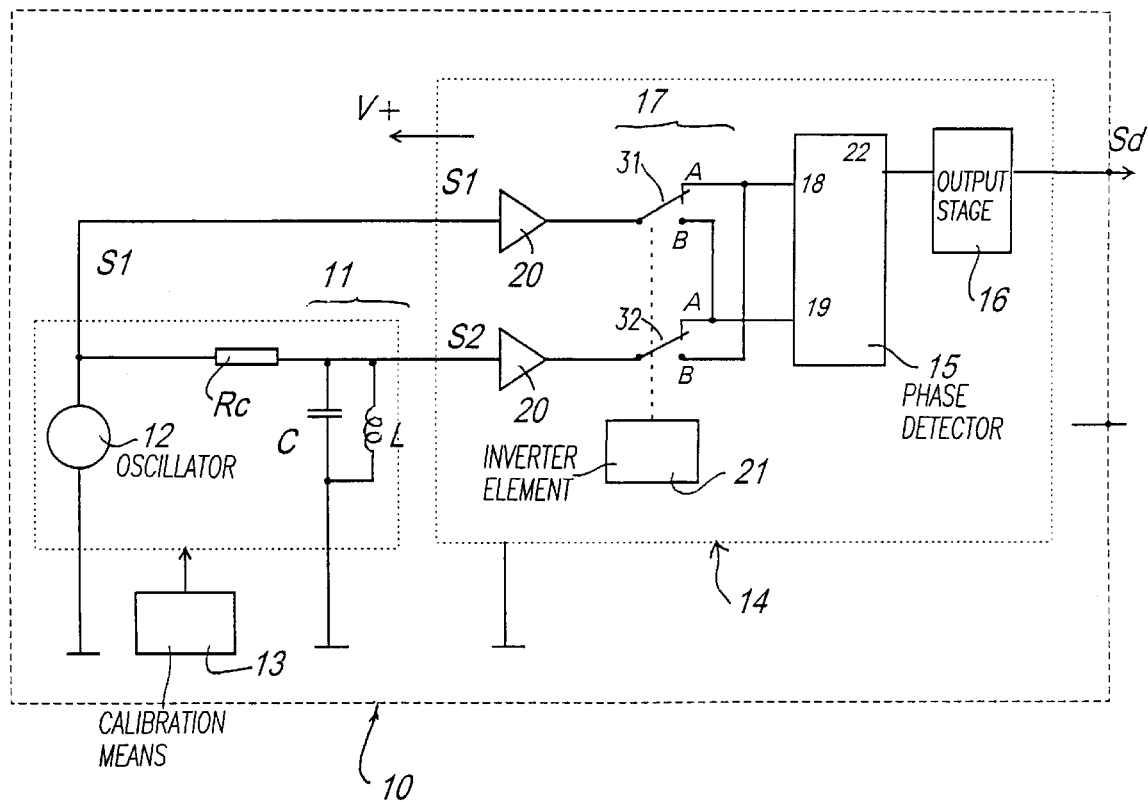
FIG. 1 shows the block diagram of a proximity detector according to the invention.

The proximity detector 10 comprises an oscillating circuit 11 composed of a capacitance C in parallel with an inductance L that forms the detecting coil. An oscillating circuit 11 is coupled through a resistance Rc to an oscillator 12 generating an oscillating signal S1, the amplitude and frequency of which remain constant when a metal object is brought close to the detector. On the other hand, the inductance L is variable when a metal object is brought close to the detector, such that the oscillating circuit 11 forced by the oscillator 12 outputs a variable oscillating signal S2.

Oscillator 12 is a quartz oscillator. It may also include an LC oscillating circuit insensitive to the approach of a metal object, or more generally a circuit with similar insensitivity and acting as a phase reference.

Oscillator 12 is powered by a voltage V+ generated from a voltage source external to the detector and it excites the oscillating circuit 11 with an oscillation with a frequency f significantly less than the critical frequency fc of the oscillating circuit. This critical frequency is defined as being the frequency at which the inductance of the oscillating circuit remains practically constant when a ferrous object is brought close to the detector. Since the oscillation of the oscillating circuit 11 is forced by the oscillation of oscillator 12, the result is that bringing a metal object close changes the phase of S2 with respect to Sl. Since the frequency f is very much lower than the frequency fc, the inductance L increases with the approach of a ferrous object and reduces with the approach of a non-ferrous object.

Calibration means 13 are associated with the oscillator and/or the oscillating circuit in order to adjust the phase between signals S1 and S2.

The proximity detector 10 uses the variation in inductance of the oscillating circuit 11 and the resulting phase variation. It includes a processing circuit 14 laid out to output a detection signal Sd switchable from a first state to a second state when the distance from the metal object exceeds a limit called the detection range. If the first state is low and the second state is high, the detector is referred to as being of the normally open (NO) output type, and otherwise it is of the normally closed (NC) output type.

Circuit 14 comprises a phase detector 15, an output stage 16 which outputs the signal Sd and an inverter device 17. The phase detector 15 has two inputs 18, 19, to which the signal Si and signal S2 are applied through signal shaping devices 20. Alternatively, the invertor device 17 can be configured so that signal S1 be applied to input 18 and signal S2 be applied to input 19. The inverter device is fitted with two inverter switches 31, 32 for this purpose, connected firstly to the signal source S1 or S2, and secondly to one of the other two inputs 18, 19 and controlled by an inverter element 21 which may be mechanical, for example with jumpers or shunts, or electronic, for example with transistors. The phase detector 15, for example of the D flip flop type or any other appropriate type, has an output 22 connected to the output stage 16, of which the signal Sd switches as a function of the signal present at the output 22. A processing circuit can be made including two phase detections in order to have two output signals, one of which identifies the presence of a ferrous object and the other identifies a non-ferrous object, and vice versa.

The proximity detector described works as follows:

It is assumed that the inverter device is in the A position, such that the fixed oscillation signal S1 and the variable oscillation signal S2 are applied to input 18 and input 19 of the phase detector 15, respectively.

If the detector calibration determined a configuration capable of detecting ferrous objects with an NO output when a ferrous object is brought close and when its distance becomes less than the calibrated range, the initially zero phase shift programmed between S1 and S2 reaches the detection threshold of the phase detector 15 and the signal Sd output by processing circuit 14 changes to the high state (ON).

If the detector calibration determined a configuration capable of detecting non-ferrous objects with an NC output, the signal Sd changes to the low state (OFF) when the distance from the object is less than the calibrated range, the phase shift varying in the opposite direction to the above.

We will now assume that the inverter device is in the B position, such that the fixed oscillation signal S1 and the variable oscillation signal S2 are applied to input 19 and input 18 of phase detector 15, respectively.

If the detector calibration determined a configuration capable of detecting ferrous objects with an NC output, the signal Sd changes to the low state (OFF) when the distance from the object drops below the calibrated range.

Finally, if the detector calibration determined a configuration capable of detecting non-ferrous objects with an NO output, the signal Sd changes to the high (ON) state when the distance from the object drops below the calibrated range.

The selectivity between families of ferrous metals and non-ferrous metals obtained with the detector according to the invention is very sharply defined, since the inductance and the resulting phase difference vary in the opposite directions depending on whether target object is ferrous or non-ferrous.

Calibration means 13 may be of the type described in document EP-678 759 in order to modify the natural frequency of the oscillating circuit 11. However, they may be composed of any means, particularly for adjusting the frequency of the control oscillator 12 or adjusting the inductance L, in order to vary the phase between signals S1 and S2.

What is claimed as new and desired to be secured by Letters Patent of the United States is:

1. An inductive proximity detector configurable to detect ferrous and non-ferrous objects, comprising:

an oscillating circuit configured to generate a first signal at a frequency dependent on the proximity of a metal object to said oscillating circuit;

an oscillator coupled to said oscillating circuit and configured to generate a second signal at a fixed oscillator frequency below a critical frequency of said oscillating circuit;

a processing circuit configured to receive said first and second signals and to generate a detection signal;

wherein said processing circuit comprises, a phase detector having a first input and a second input, said phase detector being configured to measure a phase difference between said first and second signals and to output a third signal based on said phase difference, said detection signal being based on said third signal; and an inverter device configured to provide, a first input configuration for said phase detector, wherein said first input of said phase detector receives a signal corresponding to said first signal and said second input of said phase detector receives a signal corresponding to said second signal, and a second input configuration for said phase detector, wherein said first input receives a signal corresponding to said second signal and said second input receives a signal corresponding to said first signal, whereby said processing circuit provides two phase detections, a first phase detection based on said first input configuration and a second phase detection based on said second input configuration, one of said two phase detections corresponding to a detection of ferrous objects and another one of said two phase detections corresponding to a detection of non-ferrous objects.

2. The detector of claim 1, wherein:

when said inverter device provides said first input configuration, said processing circuit operates in a normally open mode when a ferrous object is in proximity to said oscillating circuit, and in a normally closed mode when a non-ferrous object is in proximity to said oscillating circuit, and when said inverter device provides said second input configuration, said processing circuit operates in a normally closed mode when a ferrous object is in proximity to said oscillating circuit, and in a normally open mode when a non-ferrous object is in proximity to said oscillating circuit.

3. The detector of claim 1, wherein said processing circuit further comprises an inverter element configured to mechanically control said inverter device.

4. The detector of claim 1, wherein said processing circuit further comprises an inverter element configured to electronically control said inverter device.

* * * * *